(12) United States Patent
Bongartz

(10) Patent No.: US 7,083,522 B2
(45) Date of Patent: Aug. 1, 2006

(54) SYNCHRONIZING REVOLUTE JOINT

(75) Inventor: Peter Bongartz, Sankt Augustin (DE)

(73) Assignee: Automotive Components Holdings, LLC, Dearborn, MI (US)

(*) Notice: Subject to any disclaimer, the term of this patent is extended or adjusted under 35 U.S.C. 154(b) by 119 days.

(21) Appl. No.: 10/857,428

(22) Filed: May 28, 2004

(65) Prior Publication Data

US 2005/0164796 A1 Jul. 28, 2005

(30) Foreign Application Priority Data

Jun. 2, 2003 (DE) ................... 103 25 116

(51) Int. Cl.
*F16D 3/202* (2006.01)
(52) U.S. Cl. ...................... 464/111; 464/905
(58) Field of Classification Search ............... 464/124, 464/123, 132, 111, 905
See application file for complete search history.

(56) References Cited

U.S. PATENT DOCUMENTS 6,699,134 B1   3/2004   Sams et al.
6,764,406 B1 * 7/2004   Mizukoshi et al. ......... 464/111

FOREIGN PATENT DOCUMENTS

DE        102 06 733 A1    8/2002

* cited by examiner

*Primary Examiner*—Aaron Dunwoody

(57) ABSTRACT

The present invention discloses a synchronizing revolute joint with an external joint member, an internal joint member and rolling bearings arranged between the external joint member and the internal joint member. Each rolling bearing includes an inner race with a rolling bearing inner surface and an outer race with a rolling bearing outer surface. Between the inner race and the outer race there is arranged a plurality of rollers enabling the outer race to roll on the inner race. One of the inner race and the outer race includes an axial guide that determines the position of the rollers in relation to that race in the axial direction. The inner race and outer race are also axially displaceable against each other.

6 Claims, 6 Drawing Sheets

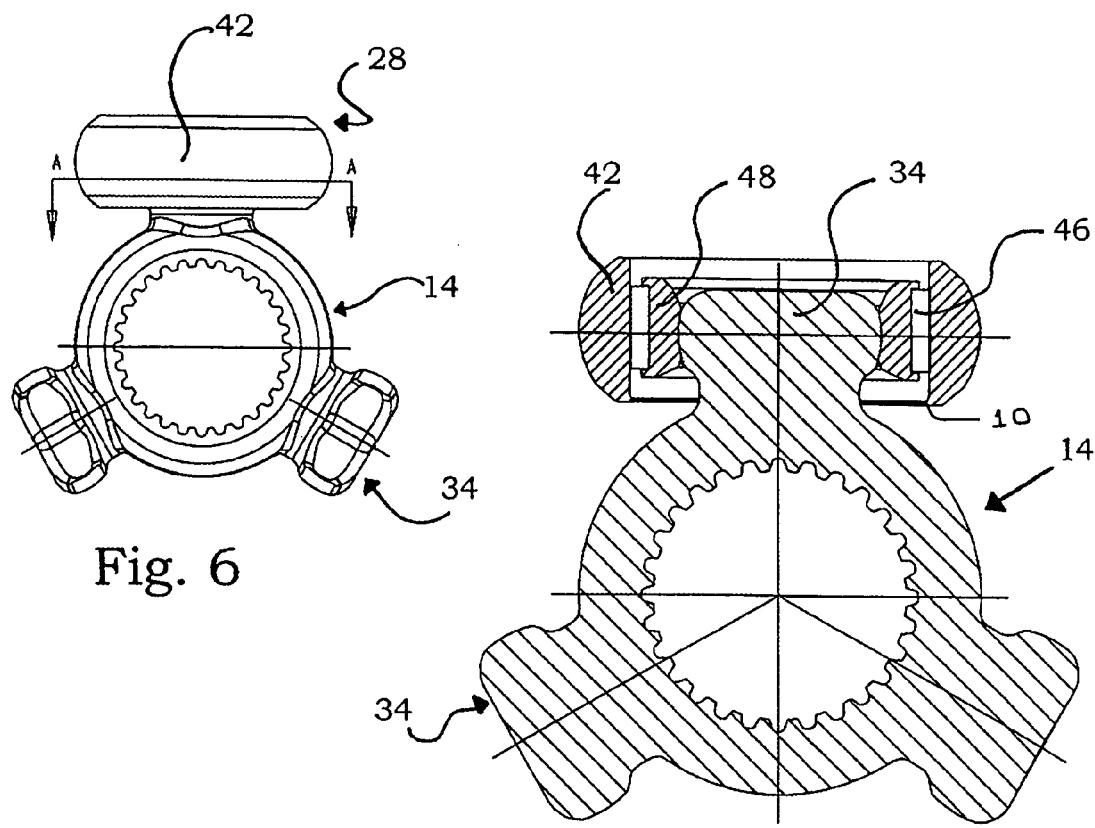
Fig. 6
Fig. 7
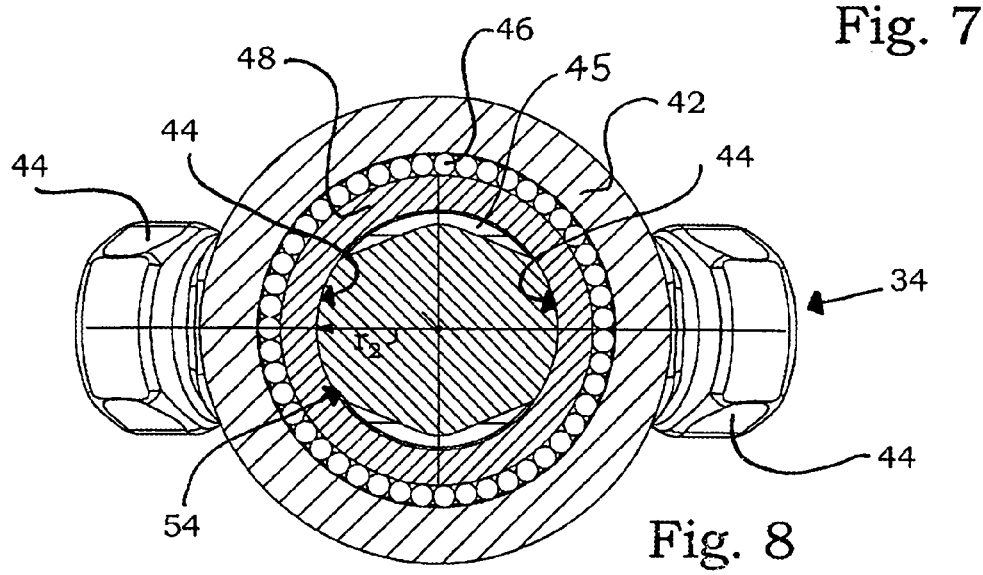
Fig. 8

SYNCHRONIZING REVOLUTE JOINT

BACKGROUND OF THE INVENTION

1. Field of the Invention

The present invention relates to synchronizing revolute joints. Such synchronizing revolute joints, which are designed, for example, for use in motor vehicles, are also referred to as homokinetic revolute joints.

2. Description of Related Technology

A state-of-the-art synchronizing revolute joint is known from DE 102 06 733 A1 (commonly owned by the Assignee of the present application), the subject matter of which is fully incorporated into the disclosure of the present application by reference. The synchronizing revolute joint disclosed therein comprises a bell-shaped external joint member with three circumferentially arranged and axially extending tracks. In the external joint member there is arranged an internal joint member with three circumferentially arranged and radially extending pivots, which include a bearing surface for a rolling bearing. The pivots are arranged to engage the tracks in the external joint member. For this purpose, rolling bearings are arranged between the external joint member and the internal joint member, each rolling bearing including an inner race with a rolling bearing inner surface, the shape of the inner surface being adapted to the bearing surface of the pivots for the rolling bearing so as to enable the pivot of the internal joint member inserted into the inner race to perform therein a tilting motion, but not a linear displacement motion. The rolling bearing further including an outer race with a rolling bearing outer surface, the shape of the outer surface being adapted to the tracks of the external joint member so as to enable an outer race inserted into the tracks to perform therein a linear displacement motion, but not a tilting motion.

A retaining ring is pressed into an outer race and the ring includes two radially inwardly extending peripheral flanges. Between the peripheral flanges there is positioned a set of rollers, which as needle bearings. An inner race supports the inner surface of the rollers, the length of the rollers being greater than the width of the inner race and the width of the outer race. This design allows a relatively large axial displacement or shift between the inner race and the rollers, the inner race being supported on the rollers over its entire width within the track independently of the fixed position of the outer race and being movable in order to keep its suitable position in relation to the pivot when the pivot swings inside it. In connection with the present invention, this type of rolling bearing is referred to as "dynamic bearing".

The construction which is known from DE 102 06 733 A1 (corresponding to U.S. Pat. No. 6,99,134, which is herein incorporated by reference) provides particular advantages with respect to low friction and the vibrationless operation of the synchronizing revolute joint. A disadvantage of that construction is, however, the relatively costly design of the rolling bearings, which increases the manufacturing costs of the synchronizing revolute joint.

It is therefore the object of the present invention to provide a synchronizing revolute joint that is of a simplified design and thus reduces the manufacturing costs, while maintaining the positive antifrictional qualities of the synchronizing revolute joint mentioned above.

According to an embodiment of the present invention, a synchronizing revolute joint is provided having an external joint member with three circumferentially arranged and axially extending tracks. Within the external member there is arranged an internal joint member with three circumferentially arranged and radially extending pivots, each of which includes a bearing surface for a rolling bearing. The pivots are arranged to engage the tracks in the external joint member. Rolling bearings are arranged between the external joint member and the internal joint member. The rolling bearings each include an inner race with a rolling bearing inner surface, the shape of said surface being adapted to the bearing surface of the pivots for the rolling bearing so as to enable the pivot of an internal joint member inserted into the inner race to perform therein a tilting motion, but not a linear displacement motion. The rolling bearings further include an outer race with a rolling bearing outer surface, the shape of said surface being adapted to the tracks of the external joint member so as to enable an outer race inserted into the track to perform therein a linear displacement motion, but not a tilting motion. Between the inner and outer races are arranged a plurality of rollers enabling the outer race to roll on the inner race.

According to one aspect of the present invention, the inner and outer races are axially displaceable against each other, the inner race including an axial guide that determines the position of the rollers in relation to the inner race in the axial direction. In an alternative embodiment, the outer race includes an axial guide that determines the position of the rollers in relation to the outer race in the axial direction.

In a preferred embodiment of the synchronizing revolute joint, the inner race or the outer race includes a stop limiting the relative axial displaceability of the inner and outer races, at least in one direction of displacement. In this way the rolling bearing can be reliably prevented from falling apart during the final assembly of the synchronizing revolute joint according to the present invention or when the assembled joint is pivoted at extreme angles. It is particularly advantageous to have the stop on that race of the rolling bearing which does not comprise the axial guide for the rollers. It is particularly preferred to have the stop on that side of the rolling bearing which, in the assembled state of the synchronizing revolute joint, faces the center of the tripod star.

It is particularly advantageous for the wear resistance of the rolling bearing if the stop is formed on the outer race and the outer contour of the inner race does not project over it, if the axial guide for the rollers is formed in the inner race. On the other hand, it is particularly advantageous if the stop is formed on the inner race and the inner contour of the outer race does not project over it, if the axial guide for the rollers is formed in the outer race. In both cases the stop abuts the rotating rollers and not the other race of the rolling bearings when there is a maximal axial displacement of the races against each other. This considerably reduces the occurring friction.

BRIEF DESCRIPTION OF THE DRAWINGS

Further features and advantages will become apparent from the subclaims and the non-restrictive embodiments, which will now be described in greater detail with reference to the accompanying drawings in which:

FIG. 6 is a top plan view of the internal joint member of the present invention with a mounted rolling bearing in axial direction;

FIG. 7 is a sectional view of the internal joint member with the mounted rolling bearing of FIG. 6, the section being taken perpendicular to the axial direction;

FIG. 8 is a section of the internal joint member with the mounted rolling bearing, the section being taken perpendicular to the radial direction and generally along line A—A of FIG. 6;

DETAILED DESCRIPTION

Figure 1:
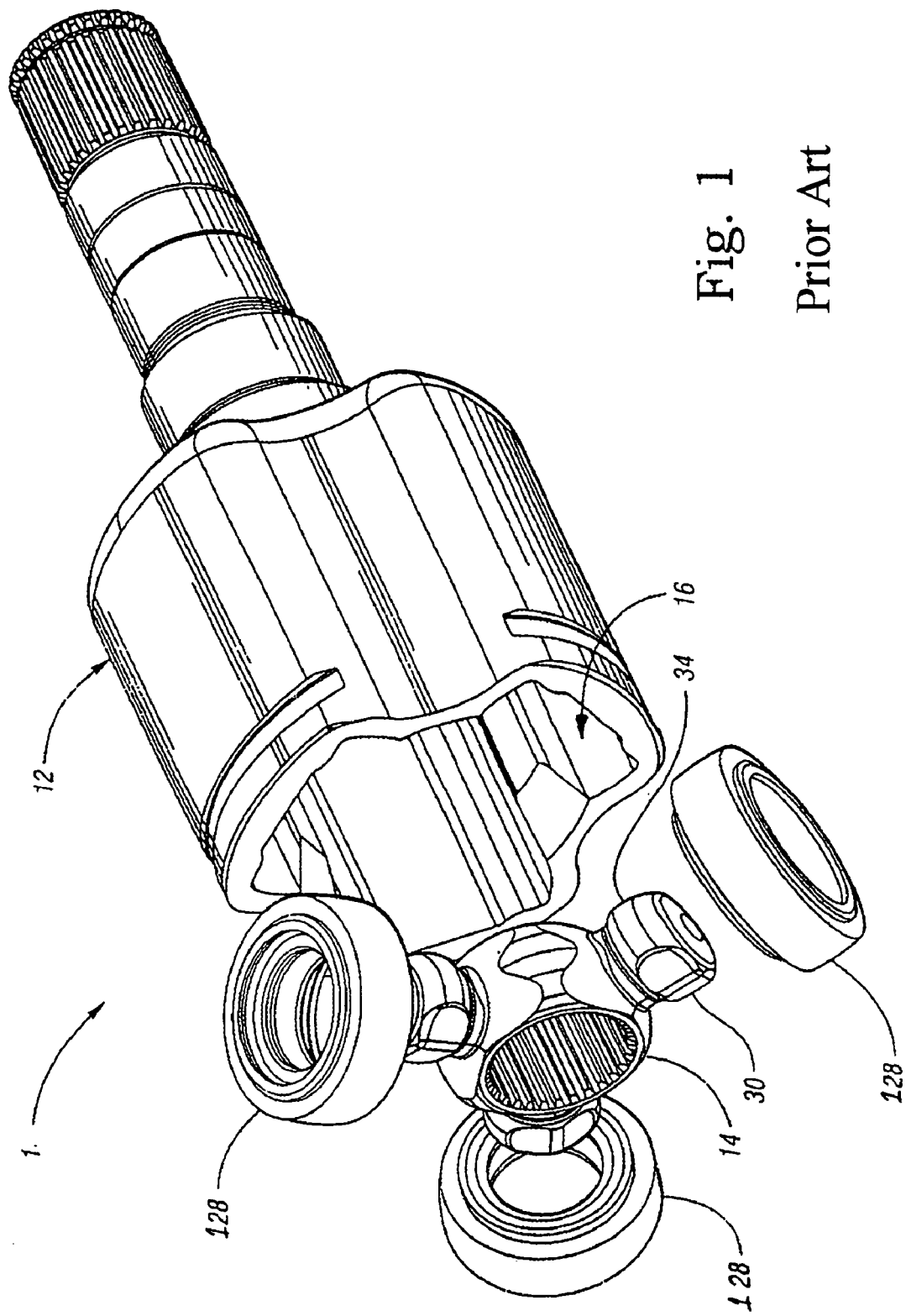
FIG. 1 is an exploded view of a known synchronizing revolute joint according to the state of the art.
Figure 2:
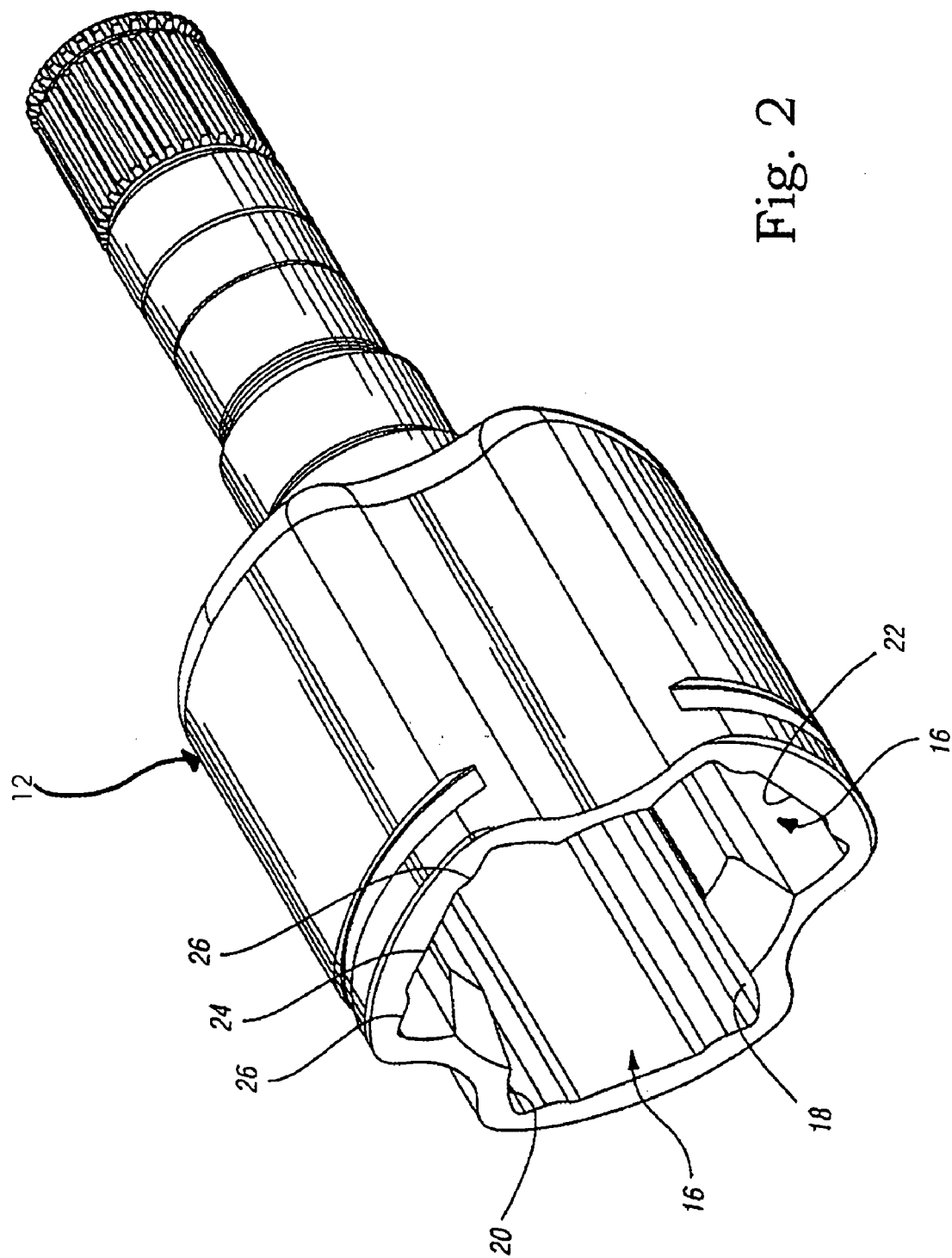
FIG. 2 is a perspective view of an external joint member of a synchronizing revolute joint embodying the principles of the present invention.
Figure 3:
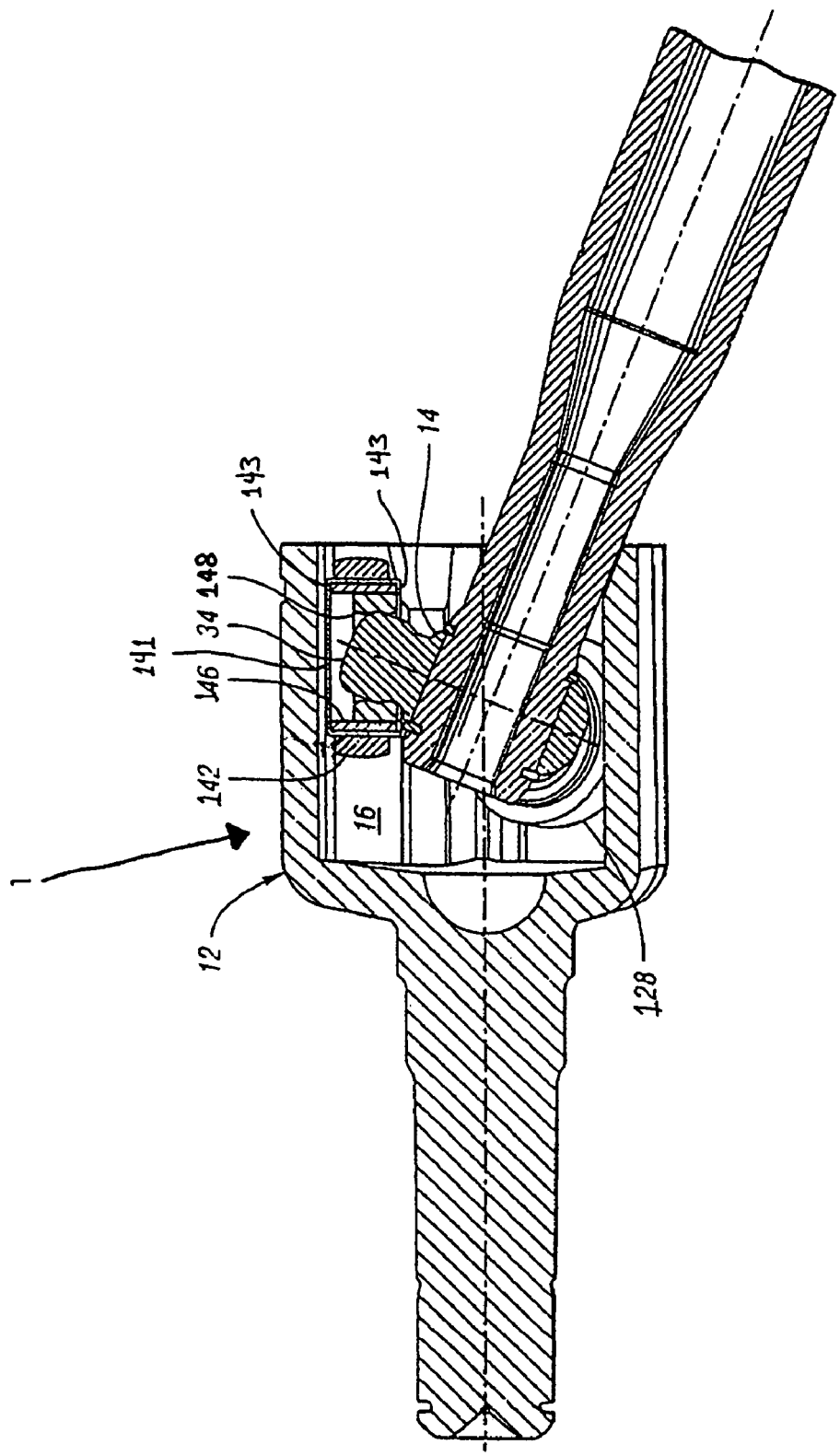
FIG. 3 is a longitudinal section of a pivotally displaced synchronizing revolute joint, similar to the joint seen in FIG. 1, and the pivoting motion of the internal joint member within the rolling bearing.

One embodiment of a synchronizing revolute joint according to the present invention will now be described with reference to FIGS. 1–10. FIGS. 1–3 show a synchronizing revolute joint known from DE 102 06 733, whose design is similar in various ways to a synchronizing revolute joint according to the present invention. As will be appreciated from the discussion that follows, one difference lies within the construction of the roller bearings.

Figure 4:
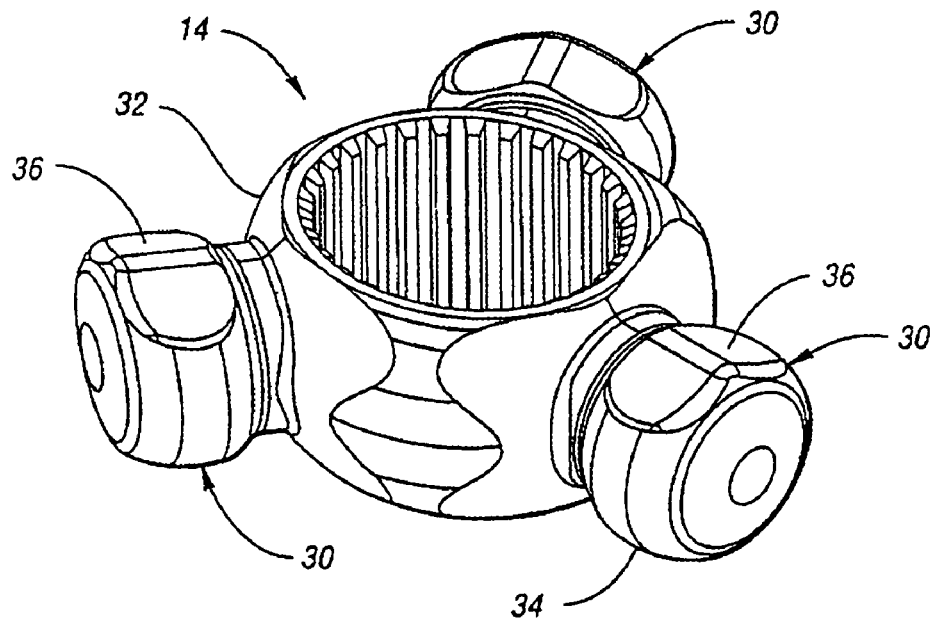
FIG. 4 is a perspective view of an internal joint member (also known as a "tripod star") of a synchronizing revolute joint embodying the principles of the present invention.

FIG. 1 is an exploded view of a synchronizing revolute joint 1 with an external joint member 12 and an internal joint member 14 in the shape of a "tripod star". The external joint member 12, separately shown in FIG. 2, and the tripod star 14, separately shown in FIG. 4, are common to both the known synchronizing revolute joint and the present invention. As seen in FIG. 2, a set of three oblong and axially extending tracks or running surfaces 16 are circumferentially arranged within the hollow space of the external joint member 12. Each track 16 has opposite inner surfaces 18, 20 and a front side 22. As shown herein, the inner surfaces 18, 20 have a spherical or concave contour. The front side 22 comprises an elevated middle portion 24. The elevated shape of the middle portion 24 of the front side 22 advantageously provides a shoulder face 26 that supports the upper side of a rolling bearing 128 and limits the displacement of the rolling bearing 128 within the track 16. Furthermore, the elevated middle portion 22 provides a lubricant channel for the optimal distribution of lubricating grease to the tracks 16 and supports surfaces in order to reduce the rolling butt contact friction whereby the trunk piston effect of the joint is reduced.

In the known bearing 128 construction, a retaining ring 141, seen in FIG. 3, is pressed into an outer race 142 and the ring 141 includes two radially inwardly extending peripheral flanges 143. Between the peripheral flanges 143 there is positioned a set of rollers 146, which as needle bearings. An inner race 148 supports the inner surface of the rollers 146, the length of the rollers 146 being greater than the width of the inner race 148 and the width of the outer race 142. This design allows a relatively large axial displacement or shift between the inner race 148 and the rollers 146, the inner race 148 being supported on the rollers 146 over its entire width within the track independently of the fixed position of the outer race 142 and being movable in order to keep its suitable position in relation to the pivot when the pivot swings inside it. In connection with the present invention, this type of rolling bearing 128 is referred to as "dynamic bearing".

Figure 5:
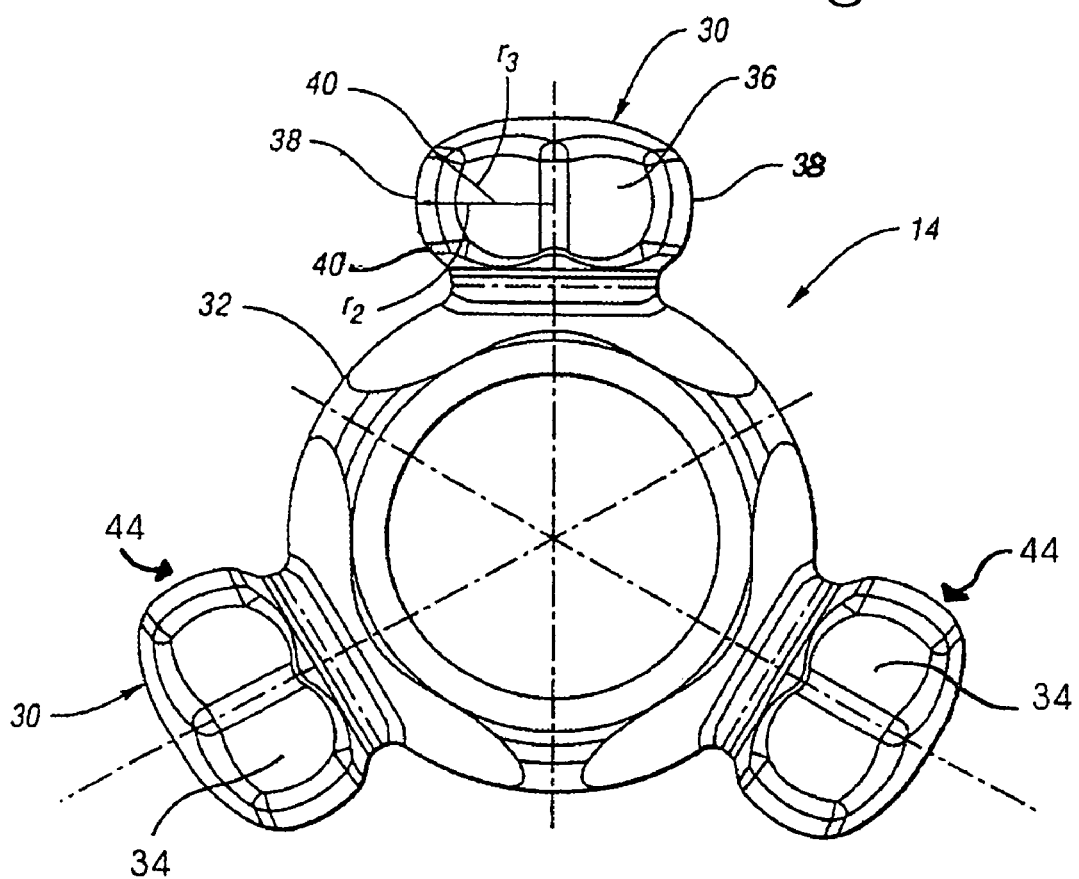
FIG. 5 is a top plan view of the internal joint member similar to that of FIG. 4 in axial direction.

As shown in FIGS. 4 and 5, the tripod star 14 includes three journals 30 circumferentially arranged on a spider 32. In the embodiment shown, each journal 30 has at its free end a pivot 34 with a partially spherical bearing surface for a rolling bearing. As described hereinafter, the pivots 34 are arranged or adapted to fit into a one-piece inner race 48 of a rolling bearing 28 (see FIG. 7). A set of truncated or flattened surface portions 36 is formed in opposite portions of the outer diameter of the pivot 34 so as to provide a lubricant channel for improved lubrication. Furthermore, the flattened surface portions 36 are adapted to enable the one-piece inner race 48 to be mounted on the pivot 34. For this purpose, the inner race 48 only has to be tilted against the pivot 34 in a suitable manner as will be shown and discussed in greater detail hereinafter.

As best shown in FIG. 5, the outer shape of the pivot 34 is formed by a spherical central portion 38 of a radius $r_2$. Upper and lower curved portions 40 extend from the central portion 38 up to the upper side of the journal 30 and down to its neck at a smaller radius $r_3$. As shown in FIG. 3, the shape of the pivots 34 allows a tilting motion of the tripod star 14 in relation to the inner race 48 of the rolling bearing 28 when the synchronizing revolute joint 1 is pivotally displaced wherein the rolling bearing 28 maintains a suitable parallel alignment in relation to the inner surfaces 18, 20 of the tracks 16.

Figure 9:
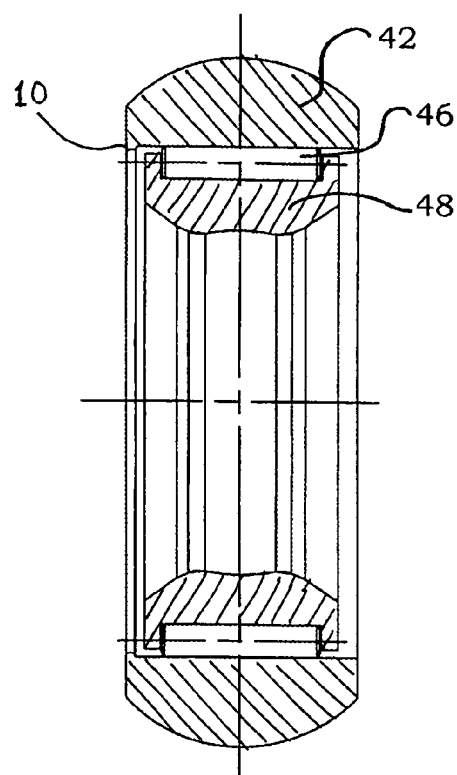
FIG. 9 is a section view of a rolling bearing according to the present invention.
Figure 10:
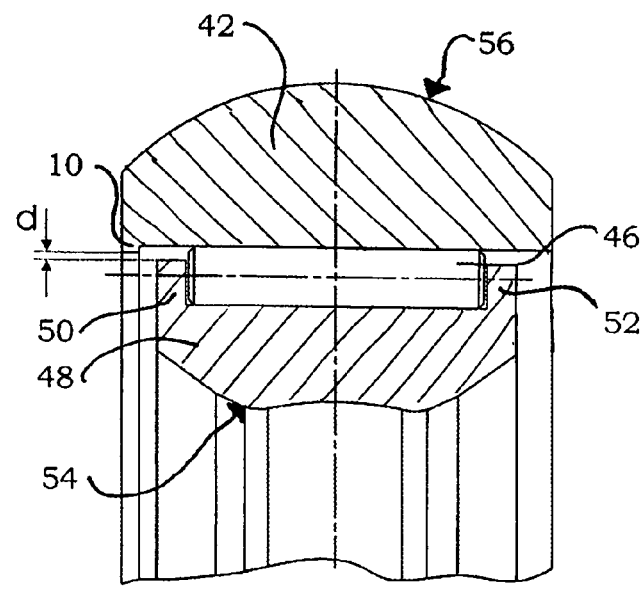
FIG. 10 shows an enlarged detail of the section of FIG. 9.

FIGS. 9 and 10 show a section of a rolling bearing 28 of a synchronizing revolute joint embodying the principles of the present invention 1. The rolling bearing 28 includes an outer race 42 and an inner race 48 between which there is positioned a set of rollers 46, such as rollers of a needle bearing. The inner race 48 further includes two radially extending lower and upper flanges 50, 52 which form an axial guide for the rollers 46. The axial guide determines the position of the rollers 46 in relation to the inner race 48 in the axial direction wherein the inner race 48 supports the rollers 46 on its outer surface. Alternatively, the flanges 50, 52 could be provided on the outer race 42.

As shown in FIGS. 9 and 10, the thickness of the outer race 42 is greater than both the thickness of the inner race 48 and the length of the rollers 46. The thickness of the outer race 42 is considerably greater than that of the inner race 48 in order to provide for sufficient axial displacement of the races of the rolling bearing against each other, wherein the inner race 48, independently of the fixed position of the outer race 42, is supported on the rollers 46 over its entire width within the track. According to the present invention, the inner race 48 is movable in order to keep its suitable position in relation to the pivot 34 when the pivot 34 swings inside it.

Referring again to FIGS. 7 and 8, the mounting of a rolling bearing 28 onto a pivot 34 will now be described. A rolling bearing 28 is mounted onto a bearing surface 44 of a pivot 34 of the trip star 14 by aligning one side of an inner race 48 with the outer side of the bearing surface 44 at a particular angle and subsequent moving the opposite side of the inner race 48 over the bearing surface 44 until the smallest-diameter portion of the inner race 48 slides over the biggest-diameter portion of the bearing surface 44. In other words, when the inner race 48 is positioned at a particular angle, the opposite side releases the outer radius of the pivot 34 and enables the entire inner race 48 to be slid or to slide over the pivot 34. When the inner race 48 has been slid over the biggest-diameter portion of the pivot 34, the rolling bearing 28 is realigned in such a manner that the inner race 48 is not positioned at the particular angle anymore wherein the rolling bearing 28 is held on the pivot 34 because of the curvature of the inner race 48.

FIG. 6 is a top view of the tripod star 14 of the synchronizing revolute joint 1 according to the present invention with a rolling bearing 28 mounted on a pivot 34. The tripod star 14 with the rolling bearing 28 mounted thereon is also shown in the sectional views of FIGS. 7 and 8. These sectional view clearly illustrates how the surface 54 of the rolling bearing 28 surrounds the bearing surface 44 of the pivot wherein a limited tilting motion of the rolling bearing 28 in relation to the axis of symmetry of the pivot 34 is possible. FIG. 8 further shows the pivot 34 with the rolling bearing 28 mounted thereon and shows radius $r_2$ of the spherical central portions 30 of the ball pivots 34 comprising the bearing surfaces 44 for rolling bearings 28. FIG. 8 also shows the lubricant channel 45 formed by the flattened surface portions 36 and arranged between the pivot 34 and the inner race 48 of the rolling bearing 28.

The mounted rolling bearing 28 in its middle working position, seen in FIG. 7, shows where the inner race 48 and the outer race 42 are positioned in a substantially centered alignment. According to the present invention, the mounted rolling bearing 28 is now even prevented from falling apart when there is a maximal displacement of the inner race 48 and the outer race 42 in relation to each other. For this purpose, the outer race 42 comprises a stop 10, which is arranged on that side of the outer race which is opposite the lower flange 50 of the inner race 48, as is readily shown in FIG. 10 (the side located toward the tri-star 14). The stop 10 abuts the rollers 46 of the rolling bearing 28 in a first extreme position of the rolling bearing 28 (see FIG. 11) and thus prevents further axial displacement of the races 42, 38 of the rolling bearing 28 in relation to each other. Arrow 11 in FIG. 11, the resulting point of mechanical contact is shown. The stop 10 prevents the rolling bearing 28 from falling apart during the final assembly of the synchronizing revolute joint according to the present invention 1 as well as during axial displacement motions thereof in a first direction. Alternatively, the stop 10 could be located on the inner race 48.

Figures 11, 12:
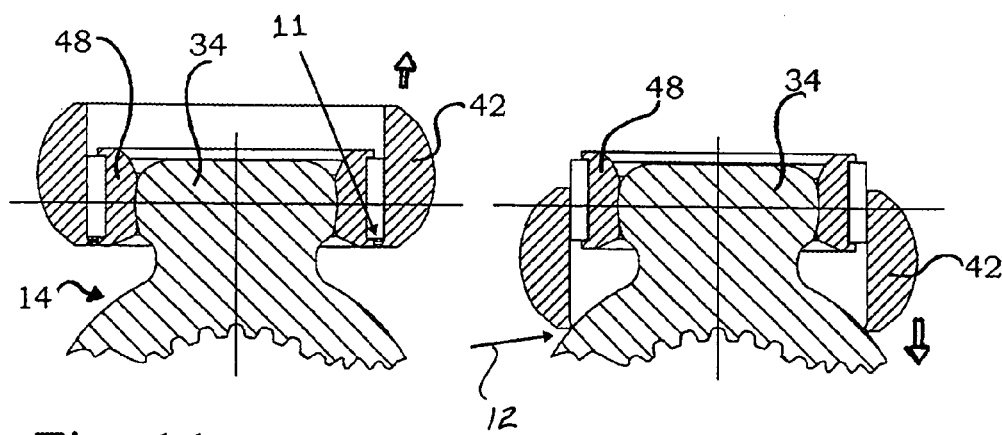
FIG. 11 shows a portion of FIG. 7 with the outer race of the rolling bearing being in its outermost radial position.
FIG. 12 shows a portion of FIG. 7 with the outer race of the rolling bearing being in its innermost radial position.

In the assembled state of the synchronizing revolute joint 1 according to the present invention, the joint 1, as well as the rolling bearing 28, are also prevented from falling apart during axial displacement motions of the races 42, 48 in the other direction by mechanically supporting the outer race 42 on the tripod star 14, as designated by the arrow 12 in FIG. 12. Such mechanical support can be achieved by choosing suitable dimensions of the outer race 42 and the tripod star 14.

The outer diameter of the inner race 48 including the flanges 50, 52, which are approximately of the same length, is smaller than the inner diameter of the outer race 42 including the stop 10 (see FIG. 10). Between the lower flange 50 and the stop 10 there remains a gap width d. The gap width d is dimensioned so as to enable the inner race 48, without roller 46 therein, to be freely moved through the outer race 42 of the rolling bearing 28. This prevents the races 42, 48 from directly mechanically supporting each other, which would result in heavy wear due to the relative rotational motion of the races 42, 48. In the present embodiment, the upper flange 52 and the lower flange 50 are therefore exclusively arranged to guide the rollers 46. This support is achieved rather indirectly by the fast rotating rollers 46 whereby the friction and thus the wear can be reduced considerably.

Regarding the assembly of the rolling bearing 28 according to the embodiment above, it has proven to be advantageous to fill the roller track of the inner race 48 with grease into which the rollers 46 are subsequently pressed. The grease filling keeps the rollers 46 stuck to the inner race 48 such that the rolling bearing 28 can easily be mounted.

As best shown in FIGS. 8, 9 and 10, each rolling bearing 28 uses on its inner race 48 a concave or spherical rolling bearing inner surface 54 to facilitate the surrounding of the spherical outer contour, that is the bearing surface 44, of the pivot 34. The concave inner surface 54 of the inner race 48 evenly distributes the points of contact between the pivot 34 and the inner race 48 when the pivot 34 swings in the rolling bearing 28. In particular, the spherical surface of the pivot 34, which is in contact with the surface of the inner race 48, reduces vibratory stresses by distributing the contact force across the big spherical surface of the pivot 34. This in turn advantageously reduces friction and potential vibration of the joint during the operation of the vehicle.

The outer surface 56 of the outer race 42 is shaped as a truncated sphere, the diameter of which being substantially the same as that of the cylindrical inner surfaces 18, 20 of the tracks 16 of the external joint member 12 in order to provide a single continuous contact area between both surfaces. The spherical surface of the outer race 42, which is in contact with the opposite inner surface of the outer race 42, which is in contact with the opposite inner surfaces 18, 20 of the tracks 16, distributes the force more evenly while reducing contact stress occurring during the operation of the joint.

Although the invention has been shown and described with respect to an exemplary embodiment thereof, it should be understood that the invention is not limited to that embodiment, but instead is susceptible to various changes and modifications, in particular according to the equivalent embodiment of claim 2.

The invention claimed is:

1. Synchronizing revolute joint comprising:

An external joint member having defined therein three circumferentially arranged and axially extending tracks, an internal joint member with three circumferentially arranged and radially extending pivots oriented with the tracks and including bearing surfaces, rolling bearings arranged between the external joint member and the internal joint member wherein each rolling bearing includes an inner race with a rolling bearing inner surface, the shape of the inner surface being adapted to the bearing surfaces of the pivots so as to enable the pivots of the internal joint member inserted into the inner race to perform therein a tilting motion but not a linear displacement motion, each rolling bearing also including an outer race with an outer surface, the shape of the outer surface being adapted to the tracks of the external joint member so as to enable an outer race inserted into a track to perform therein a linear displacement motion but not a tilting motion, a plurality of rollers is arranged between the inner race and the outer race enabling the outer race to roll on the inner race;

wherein the inner race further includes an axial guide that determines the position of the rollers in relation to the inner race in the axial direction, wherein the inner race and the outer race are axially displaceable against each other, wherein the inner race is formed as one piece, wherein the inner race is rotatable in relation to the external joint member, wherein the outer race comprises a stop limiting the relative axial displaceability of the inner race at least in one direction of displacement, and wherein the stop is formed on the outer race and the outer contour of the inner race does not project over the stop.

2. The synchronizing revolute joint according to claim 1 wherein the stop is formed on that side of the rolling bearing which, in the assembled state of the synchronizing revolute joint, faces the center of the internal joint member.

3. The synchronizing revolute joint according to claim 1 wherein the width of the outer race of the rolling bearing is dimensioned so as to keep the outer race, in the assembled state of the synchronizing revolute joint in captive connection with the inner race via the rollers even at maximal axial displacement toward the center of the internal joint member.

4. Synchronizing revolute joint comprising:

An external joint member having defined therein three circumferentially arranged and axially extending tracks, an internal joint member with three circumferentially arranged and radially extending pivots oriented with the tracks and including bearing surfaces, rolling bearings arranged between the external joint member and the internal joint member wherein each rolling bearing includes an inner race with a rolling bearing inner surface, the shape of the inner surface being adapted to the bearing surfaces of the pivots so as to enable the pivots of the internal joint member inserted into the inner race to perform therein a tilting motion but not a linear displacement motion, each rolling bearing also including an outer race with an outer surface, the shape of the outer surface being adapted to the tracks of the external joint member so as to enable an outer race inserted into a track to perform therein a linear displacement motion but not a tilting motion, a plurality of rollers is arranged between the inner race and the outer race enabling the outer race to roll on the inner race;

wherein the outer race further includes an axial guide that determines the position of the rollers in relation to the outer race in the axial direction, wherein the inner race and the outer race are axially displaceable against each other, wherein the inner race is formed as one piece, wherein the inner race is rotatable in relation to the external joint member, wherein the inner race comprises a stop limiting the relative axial displaceability of the outer race at least in one direction of displacement, and wherein the stop is formed on the inner race and the outer contour of the outer race does not project over the stop.

5. The synchronizing revolute joint according to claim 4 wherein the stop is formed on that side of the rolling bearing which in the assembled state of the synchronizing revolute joint, faces the center of the internal joint member.

6. The synchronizing revolute joint according to claim 4 wherein the width of the outer race of the rolling bearing is dimensioned so as to keep the outer race, in the assembled state of the synchronizing revolute joint, in captive connection with the inner race via the rollers even at maximal axial displacement toward the center of the internal joint member.

* * * * *